April 15, 1941.    J. H. COX    2,238,625
VAPOR ELECTRIC DEVICE
Filed Aug. 3, 1940
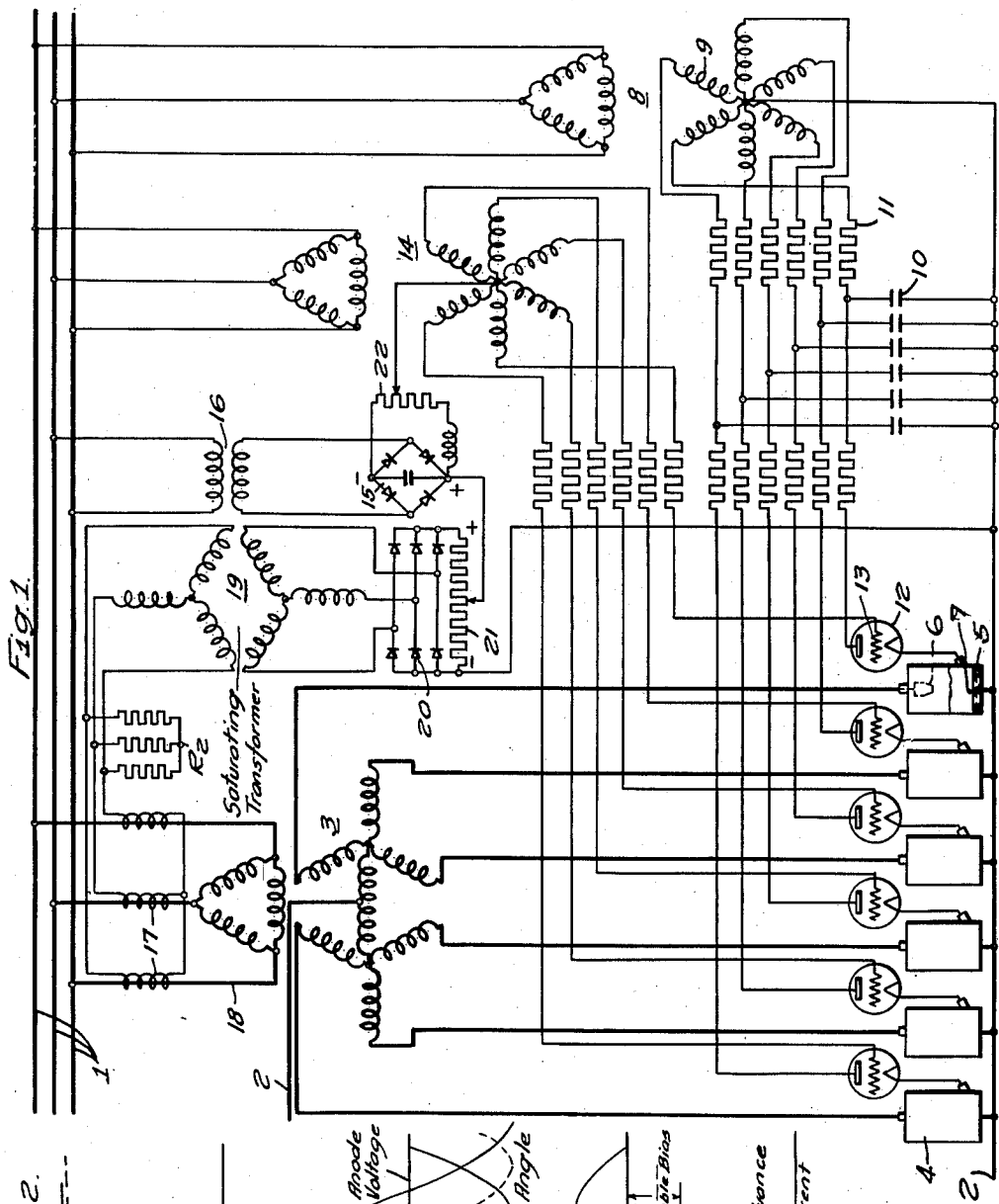
INVENTOR
Joseph H. Cox.
BY
S. A. Stricklett
ATTORNEY Patented Apr. 15, 1941

2,238,625

UNITED STATES PATENT OFFICE 2,238,625

VAPOR ELECTRIC DEVICE

Joseph H. Cox, Pittsburgh, Pa., assignor to Westinghouse Electric & Manufacturing Company, East Pittsburgh, Pa., a corporation of Pennsylvania Application August 3, 1940, Serial No. 350,225

8 Claims. (Cl. 175—363)

My invention relates to a vapor electric converter, and particularly to a compensating control system for a make-alive type converter.

In the operation of vapor electric devices there is a regulating characteristic, that is, a reduction in terminal voltage with increase in load on the converter.

It has heretofore been proposed to maintain the terminal voltage substantially constant by applying a bias proportional to the load through the converter. However, I have discovered that, when make-alive type valves are utilized, and an exciting impulse of relatively short duration is utilized for initiating the cathode spot, the heretofore available biasing systems frequently shift the impulse to a position such that misfires occur in the valves of the converter.

In the construction according to my invention, I have provided a biasing system which will increase the terminal potential to a maximum positive value and which then maintains the bias of maximum value without shifting the impulse into an unstable operating range. I have secured this result by using a current transformer energized by current flow through the make-alive type valves to provide a potential substantially proportional to the load current and connect to this current transformer a saturating transformer which saturates at a predetermined voltage and so automatically limits the potential output of the current transformer to the maximum stable operating bias.

It is, accordingly, an object of my invention to provide a stable operating control system for a vapor electric device.

It is a further object of my invention to provide a saturating transformer for limiting the biasing potential applied to the control system of a make-alive type converter.

Other objects and advantages of my invention will be apparent from the following detailed description taken in conjunction with the accompanying drawing, in which:

Figure 1 is a schematic illustration of a vapor electric converter according to my invention, Fig. 2 is a diagrammatic illustration of the characteristics of the biasing potential according to my invention, and Fig. 3 is a diagrammatic illustration of the various currents and voltages occurring in a vapor electric converter of the make-alive type.

In an exemplary embodiment of my invention according to Fig. 1, an alternating current circuit 1 is connected to a direct current circuit 2 by means of a suitable rectifier transformer 3. The flow of current between the circuits 1 and 2 is controlled by means of a plurality of make-alive type valves 4, each of said valves 4 including a vaporizable cathode 5, a cooperating anode 6 and a make-alive electrode 7 for initiating the cathode spot on the cathode 5.

Make-alive potential is periodically impressed on the make-alive electrodes 7 by means of a suitable impulsing system including a suitable source of make-alive power such as a transformer 8 having a plurality of phase windings 9 corresponding in number to the valves 4 to be controlled. Connected in parallel with each phase winding 9 of the control transformer 8 is a suitable capacitor 10 for storing make-alive energy. The capacitors 10 are charged from phase windings 9 of the transformer 8 through suitable charging impedances 11.

Connected in series with the make-alive electrodes 7 are suitable auxiliary valves or firing tubes 12, preferably of the grid controlled type, and the grids 13 of the firing tubes 12 are, in turn, controlled by a suitable grid transformer 14. The grid transformer 14 has impressed thereon a suitable biasing potential for determining the instant of operation of the firing tubes 12.

Preferably, this biasing potential consists of a substantially constant negative potential for establishing a no-load characteristic of the converter.

The constant potential may be secured from any suitable source herein illustrated as a full wave rectifying device 15 connected by means of a transformer 16 to a suitable alternating current source such as the alternating current circuit 1.

A source of biasing potential proportional to the current flow through the valves 4 is secured by means of a current transformer 17 associated with the connections 18 between the alternating current 1 and the valves 4.

The output potential of the current transformer 17 is connected to the primary winding of a saturating core transformer 19. The secondary potential of the saturating transformer 19 is rectified by suitable means such as a full wave rectifier 20, and the output potential is impressed on the grid transformer 14, preferably by means of a suitable potentiometer 21.

Preferably the constant bias and the variable bias are connected in series opposition between the grid transformer 14 and the cathodes 5 of the make-alive type valves 4.

In the operation of the system according to my invention the substantially constant negative bias is adjusted, preferably by means of a suitable potentiometer 22 to provide a delay angle sufficient to establish a no-load potential of the converter. As soon as current flows through the converter, the current transformer 17 produces a potential which is impressed on the primary winding of the saturating transformer 19. The output potential of this saturating transformer increases with load, as shown by the characteristic curves 23 and 24 of Fig. 2.

This potential decreases the angle of delay by increasing the positive bias, thus counteracting a portion of the original negative bias. As the positive bias increases, it approaches a maximum stable operating condition that is the earliest possible commutation position between the valves of the converter. This position is indicated by the dotted lines 25 in Fig. 3, and the position of the maximum advanced position of the firing impulse is also indicated in Fig. 3.

Without the interposition of the saturating transformer 19, the positive biasing potential would advance the firing angle into the region of unstable operation, as indicated at 30 in Fig. 3. In this position the potential of the succeeding valve is not sufficient to insure pick up of the arc in the event a current impulse 31 is supplied to the make-alive electrode 7. The characteristic of the variable biasing potential, and particularly the rate of rise of the biasing potential, may be adjusted by connecting a bleeder resistance $R_2$ between the current transformer 17 and the primary of the saturating transformer 19. In either event the maximum positive bias will be determined because of the saturating characteristic of the transformer 19 at a potential within the stable operating range of the converter.

While for purposes of illustration I have shown and described a specific embodiment of my invention, it is apparent that changes and modifications can be made therein without departing from the true spirit of my invention, and the scope of the appended claims.

I claim as my invention:

1. An electric current conversion system comprising a plurality of make-alive type valves, a make-alive electrode for each of said valves, a source of make-alive energy, grid controlled auxiliary valves for applying energy from said source to the make-alive electrodes, a grid transformer for controlling the auxiliary valves, a current transformer energized by current flow through said valves, a saturating core transformer connected to said current transformer, means for rectifying the output potential of said saturating transformer, and means for impressing the rectified output of said saturating transformer on the grids of the auxiliary valves in series with the output of the grid transformer.

2. An electric current conversion system comprising a plurality of make-alive type valves, a make-alive electrode for each of said valves, a source of make-alive energy, grid controlled auxiliary valves for applying energy from said source to the make-alive electrodes, a grid transformer for controlling the auxiliary valves, a current transformer energized by current flow through said valves, a saturating core transformer connected to said current transformer, means for rectifying the output potential of said saturating transformer, means for impressing the rectified output of said saturating transformer on the grids of the auxiliary valves in series with the output of the grid transformer, and a bleeding resistor connected between said current transformer and said saturating transformer.

3. A control system for a make-alive type converter comprising a plurality of make-alive valves, a make-alive electrode in each of said valves, means for supplying control impulses for said make-alive electrodes, a grid controlled auxiliary valve in series with each of said make-alive electrodes, a grid transformer for controlling said auxiliary valves, a source of negative biasing potential, a source of variable positive biasing potential, circuit means for impressing the potential of each of said sources of biasing potential in series with said grid transformer and means for determining the maximum potential delivered by said source of positive biasing potential.

4. A control system for a make-alive type converter comprising a plurality of make-alive valves, a make-alive electrode in each of said valves, means for supplying control impulses for said make-alive electrodes, a grid controlled auxiliary valve in series with each of said make-alive electrodes, a grid transformer for controlling said auxiliary valves, a source of negative biasing potential, a source of variable positive biasing potential, circuit means for impressing the potential of each of said source of biasing potential in series with said grid transformer, means for determining the maximum potential delivered by said source of positive biasing potential, and means for determining the rate of increase of the potential delivered by the source of positive biasing potential.

5. In a vapor-electric converter having a plurality of make-alive type valves, a control system comprising a source of make-alive potential, grid control means for applying said make-alive potential to the make-alive electrodes of the valves, a grid transformer for controlling said grid control means, a substantially constant biasing potential connecting said grid transformer, a current transformer energized by current flow through said valves, a saturating transformer energized by the potential of said current transformer means for rectifying the output potential of said saturating transformer, and means for connecting the output potential of said saturating transformer in series opposition to said first-mentioned biasing potential.

6. In a vapor-electric converter having a plurality of make-alive type valves, a control system comprising a source of make-alive potential, grid control means for applying said make-alive potential to the make-alive electrodes of the valves, a grid transformer for controlling said grid control means, a substantially constant biasing potential connecting said grid transformer, a current transformer energized by current flow through said valves, a saturating transformer energized by the potential of said current transformer means for rectifying the output potential of said saturating transformer, means for connecting the output potential of said saturating transformer in series opposition to said first-mentioned biasing potential, a bleeder resistance connected between said current transformer and said saturating transformer.

7. A vapor-electric conversion system comprising a plurality of make-alive type valves, a make-alive electrode in each of said valves, means including a grid controlled firing tube for supplying current impulses to said make-alive electrodes, a grid transformer for controlling said grid controlled firing tube, a source of substantially constant direct current potential, a source of direct current potential variable with the current through the tubes over a predetermined load range and means for connecting said constant direct current potential and said variable direct current potential in series opposition between the grid transformer and the cathodes of the make-alive valves.

8. A vapor-electric conversion system comprising a plurality of make-alive type valves, a make-alive electrode in each of said valves, means including a grid controlled firing tube for supplying current impulses to said make-alive electrodes, a grid transformer for controlling said grid controlled firing tube, a source of substantially constant direct current potential, a source of direct current potential variable with the current through the valves over a predetermined load range, means for connecting said constant direct current potential and said variable direct current potential in series opposition between the grid transformer and the cathodes of the make-alive valves, and means for changing the characteristic of the variable direct current.

JOSEPH H. COX.